(12) United States Patent
Sanghavi et al.

(10) Patent No.: US 10,344,651 B1
(45) Date of Patent: Jul. 9, 2019

(54) SYSTEMS AND METHODS FOR PURGING A REDUCTANT INSERTION ASSEMBLY OF A REDUCTANT

(71) Applicant: Cummins Emission Solutions Inc., Columbus, IN (US)

(72) Inventors: Karan Sanghavi, Columbus, IN (US); Nicholas Blodgett, Columbus, IN (US)

(73) Assignee: Cummins Emission Solutions Inc., Columbus, IN (US)

( * ) Notice: Subject to any disclaimer, the term of this patent is extended or adjusted under 35 U.S.C. 154(b) by 12 days.

(21) Appl. No.: 15/866,095

(22) Filed: Jan. 9, 2018

(51) Int. Cl.
| | |
|---|---|
| *F01N 3/08* | (2006.01) |
| *F01N 3/20* | (2006.01) |
| *B01D 53/94* | (2006.01) |
| *F01N 3/30* | (2006.01) |

(52) U.S. Cl.
CPC ....... *F01N 3/2073* (2013.01); *B01D 53/9431* (2013.01); *F01N 3/0814* (2013.01); *F01N 3/208* (2013.01); *F01N 3/303* (2013.01); *B01D 2251/2067* (2013.01); *F01N 2610/02* (2013.01); *F01N 2610/144* (2013.01); *F01N 2610/1406* (2013.01); *F01N 2610/1473* (2013.01); *F01N 2610/1493* (2013.01)

(58) Field of Classification Search
CPC ...... F01N 3/2073; F01N 3/0814; F01N 3/208; F01N 3/2066; F01N 3/303; F01N 2610/1406; F01N 2610/144; F01N 2610/1473; F01N 2610/1493; F01N 2610/02; B01D 53/9431; B01D 2251/2067

USPC ............ 60/274, 286, 295, 299–301
See application file for complete search history.

(56) References Cited

U.S. PATENT DOCUMENTS

| | | | | |
|---|---|---|---|---|
| 5,708,201 | A * | 1/1998 | Kaub | F02D 33/003 340/439 |
| 6,063,350 | A * | 5/2000 | Tarabulski | B01D 53/90 423/239.1 |
| 7,818,961 | B2 | 10/2010 | Leonard | |
| 9,422,850 | B2 | 8/2016 | Myer et al. | |
| 2010/0115928 | A1* | 5/2010 | Asaura | B01D 53/90 60/287 |

(Continued)

FOREIGN PATENT DOCUMENTS

| | | |
|---|---|---|
| WO | WO 2013/028741 | 2/2013 |
| WO | WO 2014/143851 | 9/2014 |

*Primary Examiner* — Mark A Laurenzi
*Assistant Examiner* — Dapinder Singh
(74) *Attorney, Agent, or Firm* — Foley & Lardner LLP

(57) ABSTRACT

A reductant insertion assembly includes: a first pump configured to pump a predetermined amount of a reductant into a selective catalytic reduction system; a reductant delivery line configured to deliver the reductant to the first pump from a reductant storage tank; a reductant return line configured to return reductant to the reductant storage tank from the first pump; a second pump configured to pump the reductant from the reductant storage tank to the first pump; and a valve selectively moveable between a closed position in which the second pump pumps the reductant through the reductant delivery line to the first pump, and an open position in which the second pump draws air through the valve and pumps the air through at least a portion of the reductant delivery line downstream of the valve and the first pump to purge the reductant insertion assembly of the reductant.

20 Claims, 5 Drawing Sheets

(56) References Cited

U.S. PATENT DOCUMENTS

2010/0322791 A1* 12/2010 Wadsley ................. F04B 1/28
                                                    417/286
2016/0326929 A1* 11/2016 Myer ..................... F01N 3/208

* cited by examiner

SYSTEMS AND METHODS FOR PURGING A REDUCTANT INSERTION ASSEMBLY OF A REDUCTANT

TECHNICAL FIELD

The present disclosure relates generally to aftertreatment systems for use with internal combustion (IC) engines.

BACKGROUND

Exhaust aftertreatment systems are used to receive and treat exhaust gas generated by IC engines. Generally exhaust gas aftertreatment systems comprise any of several different components to reduce the levels of harmful exhaust emissions present in exhaust gas. For example, certain exhaust gas aftertreatment systems for diesel-powered IC engines comprise a selective catalytic reduction (SCR) system, including a catalyst formulated to convert NOx (NO and $NO_2$ in some fraction) into harmless nitrogen gas ($N_2$) and water vapor ($H_2O$) in the presence of ammonia ($NH_3$). Generally in such aftertreatment systems, an exhaust reductant (e.g., a diesel exhaust fluid such as urea) is injected into the SCR system to provide a source of ammonia and mixed with the exhaust gas to partially reduce the NOx gases. The reduction byproducts of the exhaust gas are then fluidly communicated to the catalyst included in the SCR system to decompose substantially all of the NOx gases into relatively harmless byproducts that are expelled out of the aftertreatment system.

Aftertreatment systems generally include a reductant insertion assembly for inserting a reductant into the SCR system. Conventional reductant insertion assemblies generally include one or more pumps with motors and/or other moving parts to pressurize and deliver the reductant to the SCR system. The reductant can form deposits in the pumps and may cause corrosion in the pump causing increased pump failure rates, limited flow rates, and frequent maintenance, thereby raising maintenance costs. Furthermore, when an engine associated with the aftertreatment system is turned OFF, reductant may remain in one or more reductant delivery lines, pumps, injectors, etc., and form reductant deposit, leading to more frequent maintenance and higher maintenance costs.

SUMMARY

Embodiments described herein relate generally to systems and methods for purging a reductant insertion assembly of reductant. In particular, embodiments described herein relate to a reductant insertion assembly comprising a first pump, a second pump positioned upstream of the first pump and a valve positioned between the second pump and a reductant storage tank. The valve may be selectively opened to allow air to flow into a reductant delivery line, the air pumped by the second pump through the reductant insertion assembly so as to purge the reductant insertion assembly of any residual reductant when an engine associated with the reductant insertion assembly is turned OFF.

In a first set of embodiments, a reductant insertion assembly includes: a first pump configured to pump a predetermined amount of a reductant into a selective catalytic reduction system; a reductant delivery line fluidly coupled to the first pump, the reductant delivery line configured to deliver the reductant to the first pump from a reductant storage tank; a reductant return line fluidly coupled to the first pump and configured to return at least a portion of the reductant to the reductant storage tank from the first pump; a second pump positioned in the reductant delivery line upstream of the first pump, the second pump configured to pump the reductant from the reductant storage tank to the first pump; and a valve positioned in the reductant delivery line upstream of the second pump, the valve being selectively moveable between a closed position in which the second pump pumps the reductant through the reductant delivery line to the first pump, and an open position in which the second pump draws air through the valve and pumps the air through at least a portion of the reductant delivery line downstream of the valve and the first pump to purge the reductant insertion assembly of the reductant.

In another set of embodiments, an aftertreatment system for use with an engine producing exhaust gas includes: a selective catalytic reduction system configured to decompose constituents of the exhaust gas; a reductant storage tank configured to store a reductant; and a reductant insertion assembly fluidly coupled to the reductant storage tank, the reductant insertion assembly including: a first pump configured to pump a predetermined amount of a reductant into the selective catalytic reduction system; a reductant delivery line fluidly coupled to the first pump, the reductant delivery line configured to deliver the reductant to the first pump from the reductant storage tank; a reductant return line fluidly coupled to the first pump and configured to return at least a portion of the reductant to the reductant storage tank from the first pump; a second pump positioned in the reductant delivery line upstream of the first pump, the second pump configured to pump the reductant from the reductant storage tank to the first pump; and a valve positioned in the reductant delivery line upstream of the second pump, the valve being selectively moveable between a closed position in which the second pump pumps the reductant through the reductant delivery line to the first pump, and an open position in which the second pump draws air through the valve and pumps the air through at least a portion of the reductant delivery line downstream of the valve and the first pump to purge the reductant insertion assembly of the reductant.

In yet another set of embodiments, a method for purging a reductant from a reductant insertion assembly included in an aftertreatment system, the reductant insertion assembly comprising a first pump, a second pump and a valve, includes: pumping the reductant from a reductant storage tank to the first pump via the second pump; determining an engine operating condition of an engine fluidly coupled to the aftertreatment system; in response to determining that the engine is off, opening the valve so as to allow air to enter the reductant insertion assembly; and pumping the air through the reductant insertion assembly for a predetermined pumping time via the second pump so as to purge the reductant insertion assembly of the reductant.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF THE DRAWINGS

The foregoing and other features of the present disclosure will become more fully apparent from the following description and appended claims taken in conjunction with the accompanying drawings. Understanding that these drawings depict only several implementations in accordance with the disclosure and are therefore not to be considered limiting of its scope, the disclosure will be described with additional specificity and detail through use of the accompanying drawings.

Figure 1:
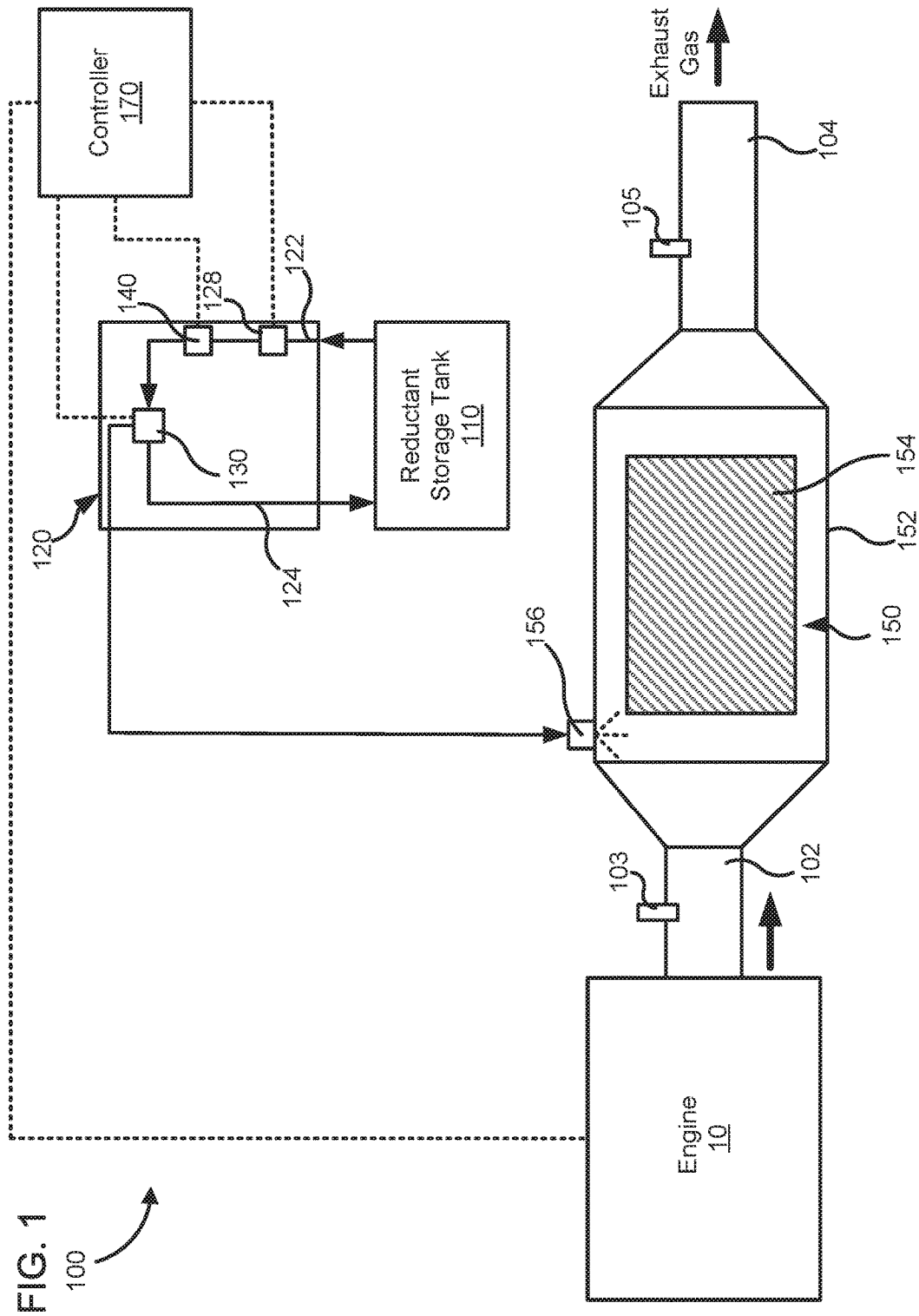
FIG. 1 is a schematic illustration of an aftertreatment system, according to an embodiment.

Reference is made to the accompanying drawings throughout the following detailed description. In the drawings, similar symbols typically identify similar components unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein and illustrated in the figures, can be arranged, substituted, combined, and designed in a wide variety of different configurations, all of which are explicitly contemplated and made part of this disclosure.

DETAILED DESCRIPTION

Embodiments described herein relate generally to systems and methods for purging a reductant insertion assembly of reductant. In particular, embodiments described herein relate to a reductant insertion assembly comprising a first pump, a second pump positioned upstream of the first pump and a valve positioned between the second pump and a reductant storage tank. The valve may be selectively opened to allow air to flow into a reductant delivery line, the air pumped by the second pump through the reductant insertion assembly so as to purge the reductant insertion assembly of any residual reductant when an engine associated with the reductant insertion assembly is turned OFF.

Aftertreatment systems generally comprise a reductant insertion assembly for inserting a reductant into the SCR system. Conventional reductant insertion assemblies generally include one or more pumps with motors and/or other moving parts to pressurize and deliver the reductant to the SCR system. The reductant can form deposits in the pumps and may cause corrosion in the pump causing increased pump failure rates, limited flow rates, and frequent maintenance, thereby raising maintenance costs. Furthermore, when an engine associated with the aftertreatment system is turned OFF, reductant may remain in one or more reductant delivery lines, pumps, injectors, etc., and form reductant deposit, leading to more frequent maintenance and higher maintenance costs.

Conventional reductant insertion assemblies include a bypass line to return any reductant remaining within the reductant insertion assembly after the engine is turned OFF to the reductant storage tank, which complicates the design of the reductant insertion assembly. Furthermore, conventional reductant insertion assemblies may include bi-directional pumps capable of pumping the reductant in a forward and backward direction for purging the reductant insertion assembly, which may increase manufacturing costs.

Various embodiments of the systems and methods described herein may provide benefits including, for example: (1) purging of a reductant insertion assembly with air via a simple opening and closing of a valve positioned in a reductant delivery line; (2) allowing purging of the reductant insertion assembly using a uni-directional pump capable of pumping both air and a reductant; (3) providing gravity induced return of any remaining reductant in the reductant insertion assembly to a reductant storage tank without active pumping; and (4) reducing manufacturing costs by eliminating use of a bypass line and/or bi-directional pumps, as well as reducing maintenance costs.

FIG. 1 is a schematic illustration of an aftertreatment system 100, according to an embodiment. The aftertreatment system 100 is configured to receive an exhaust gas (e.g., a diesel exhaust gas) from an engine 10 (e.g., a diesel engine, a gasoline engine, a biodiesel engine, a natural gas engine, a dual fuel engine, etc.) and reduce constituents of the exhaust gas such as, for example, NOx gases, CO, hydrocarbons, etc. The aftertreatment system 100 may comprise a reductant storage tank 110, a reductant insertion assembly 120 and a SCR system 150. In some embodiments, the aftertreatment system 100 may also comprise a controller 170.

The SCR system 150 comprises a housing 152 defining an internal volume within which at least one catalyst 154 is positioned. The housing 152 may be formed from a rigid, heat-resistant and corrosion-resistant material, for example stainless steel, iron, aluminum, metals, ceramics, or any other suitable material. The housing 152 may have any suitable cross-section, for example circular, square, rectangular, oval, elliptical, polygonal, or any other suitable shape.

In some embodiments, the SCR system 150 may comprise a selective catalytic reduction filter (SCRF) system, or any other aftertreatment component, configured to decompose constituents of the exhaust gas (e.g., NOx gases such as such nitrous oxide, nitric oxide, nitrogen dioxide, etc.), flowing through the aftertreatment system 100 in the presence of a reductant, as described herein.

Although FIG. 1 shows only the catalyst 154 positioned within the internal volume defined by the housing 152, in other embodiments, a plurality of aftertreatment components may be positioned within the internal volume defined by the housing 152 in addition to the SCR system 150. Such aftertreatment components may comprise, for example, filters (e.g., particulate matter filters, catalyzed filters, etc.), oxidation catalysts (e.g., carbon monoxide, hydrocarbons and/or ammonia oxidation catalysts), mixers, baffle plates, or any other suitable aftertreatment component.

An inlet conduit 102 is fluidly coupled to an inlet of the housing 152 and configured to receive exhaust gas from the engine 10. The inlet conduit 102 communicates the exhaust gas to an internal volume defined by the housing 152. Furthermore, an outlet conduit 104 may be coupled to an outlet of the housing 152 and configured to expel treated exhaust gas into the environment.

A first sensor 103 may be positioned in the inlet conduit 102. The first sensor 103 may comprise a NOx sensor, for example a physical or virtual NOx sensor, configured to determine an amount of NOx gases included in the exhaust gas being emitted by the engine 10. In various embodiments, an oxygen sensor, a temperature sensor, a pressure sensor, or any other sensor may also be positioned in the inlet conduit 102 so as to determine one or more operational parameters of the exhaust gas flowing through the aftertreatment system 100. In particular embodiments, the first sensor 103 may comprise a virtual sensor. A second sensor 105 may be positioned in the outlet conduit 104. The second sensor 105 may comprise a second NOx sensor configured to determine an amount of NOx gases expelled into the environment after passing through the SCR system 150.

The catalyst 154 is formulated to decompose constituents of an exhaust gas, for example NOx gases, flowing through the aftertreatment system 100. An injector 156 may be provided on a sidewall of housing 152 and may be in fluid communication with the internal volume of the housing 152, for example via a reductant insertion port defined on a sidewall of the housing 152. The injector 156 is configured to selectively insert a reductant into the internal volume defined by the housing 152. The injector 156 may be positioned upstream of the catalyst 154 (e.g., to allow the reductant to be inserted into the exhaust gas upstream of the catalyst 154) or over the catalyst 154 (e.g., to allow reductant to be inserted directly on the catalyst 154).

The catalyst 154 is formulated to selectively decompose constituents of the exhaust gas. Any suitable catalyst can be used such as, for example, platinum, palladium, rhodium, cerium, iron, manganese, copper, vanadium based catalyst, any other suitable catalyst, or a combination thereof. The catalyst 154 can be disposed on a suitable substrate such as, for example, a ceramic (e.g., cordierite) or metallic (e.g., kanthal) monolith core which can, for example, define a honeycomb structure. A washcoat can also be used as a carrier material for the catalyst 154. Such washcoat materials may comprise, for example, aluminum oxide, titanium dioxide, silicon dioxide, any other suitable washcoat material, or a combination thereof. The exhaust gas (e.g., diesel exhaust gas) can flow over and/or about the catalyst 154 such that any NOx gases included in the exhaust gas are further reduced to yield an exhaust gas which is substantially free of NOx gases.

The reductant storage tank 110 is configured to store the reductant. The reductant is formulated to facilitate decomposition of the constituents of the exhaust gas (e.g., NOx gases included in the exhaust gas). Any suitable reductant can be used. In some embodiments, the exhaust gas comprises a diesel exhaust gas and the reductant comprises a diesel exhaust fluid. For example, the diesel exhaust fluid may comprise urea, an aqueous solution of urea, or any other fluid that comprises ammonia, by-products, or any other diesel exhaust fluid as is known in the arts (e.g., the diesel exhaust fluid marketed under the name ADBLUE®). In particular embodiments, the reductant comprises an aqueous urea solution having a particular ratio of urea to water. For example, the reductant may comprise an aqueous urea solution including 32.5% by volume of urea and 67.5% by volume of deionized water.

A reductant insertion assembly 120 is fluidly coupled to the reductant storage tank 110. The reductant insertion assembly 120 is configured to selectively insert the reductant into the SCR system 150 or upstream thereof (e.g., into the inlet conduit 102 or a mixer (not shown) positioned upstream of the SCR system 150).

Figure 2A:
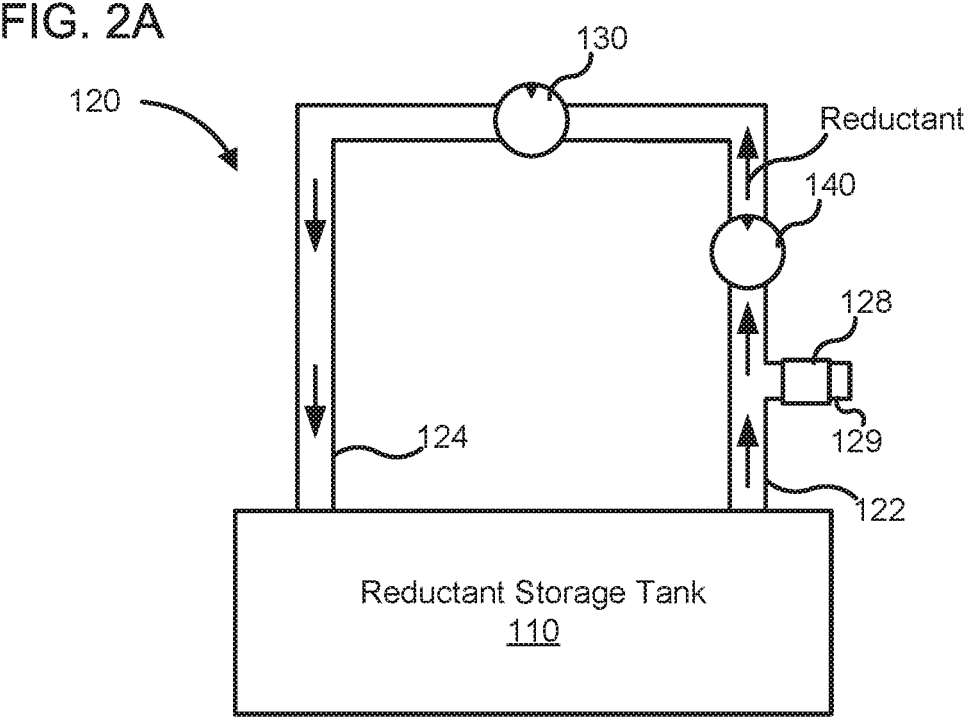
FIG. 2A is a schematic illustration of the reductant insertion assembly of FIG. 1 with a valve included therein in a closed position.
Figure 2B:
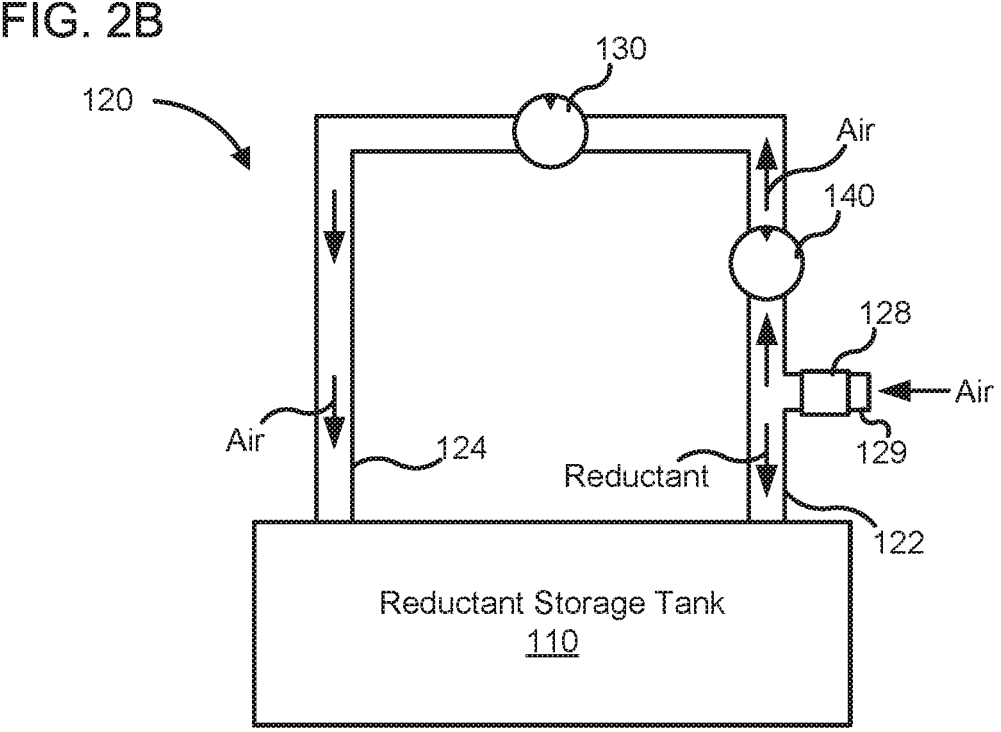
FIG. 2B shows the reductant insertion assembly of FIG. 2A with the valve in an open position.

Referring also now to FIGS. 2A-2B, the reductant insertion assembly 120 comprises a first pump 130 configured to pump a predetermined amount of reductant into the SCR system 150. In some embodiments, the first pump 130 may comprise a diaphragm pump but any other suitable pump may be used such as, for example, a centrifugal pump, a suction pump, a positive displacement pump, etc.

Screens, check valves, pulsation dampers, or other structures may also be positioned downstream of the first pump 130 to provide the reductant to the SCR system 150. In various embodiments, the reductant insertion assembly 120 may also comprise a blending chamber configured to receive pressurized reductant from a metering valve positioned downstream of the first pump 130 at a controllable rate. The blending chamber may also be configured to receive air, or any other inert gas (e.g., nitrogen), for example from an air supply unit so as to deliver a combined flow of the air and the reductant to the SCR system 150 through the injector 156. In various embodiments, a nozzle may be provided in the injector 156 and configured to deliver a stream or a jet of the reductant into the internal volume of the housing 152 so as to deliver the reductant to the catalyst 154 of the SCR system 150.

In various embodiments, the reductant insertion assembly 120 may also comprise a dosing valve, for example positioned within a reductant insertion line for delivering the reductant from the reductant insertion assembly 120 to the SCR system 150. The dosing valve can comprise any suitable valve, for example a butterfly valve, a gate valve, a check valve (e.g., a tilting disc check valve, a swing check valve, an axial check valve, etc.), a ball valve, a spring loaded valve, an air assisted injector, a solenoid valve, or any other suitable valve.

A reductant delivery line 122 is fluidly coupled to the first pump 130. The reductant delivery line 122 may include a tube, a pipe, a conduit, a hose, or any other suitable delivery line, and is configured to deliver the reductant to the first pump 130 from the reductant storage tank 110. Moreover, a reductant return line 124 is also coupled to the first pump 130 and configured to return at least a portion of the reductant to the reductant storage tank 110 from the first pump 130. The reductant return line 124 may include a tube, a pipe, a conduit, a hose, or any other suitable return line. For example, the reductant return line 124 may be configured to return excess reductant from the first pump 130 back to the reductant storage tank 110. In particular embodiments, a pressure relief valve may be positioned in the reductant return line 124. The pressure relief valve (e.g., a check valve or pressure activated valve) may open if a pressure in the first pump 130 exceeds a predetermined pressure threshold, and the excess reductant may flow back from the first pump 130 to the reductant storage tank 110 via the reductant return line 124.

A second pump 140 is positioned in the reductant delivery line 122 upstream of the first pump 130. The second pump 140 is configured to pump the reductant from the reductant storage tank 110 to the first pump 130. For example, the second pump 140 may be configured to provide the reductant to the first pump 130 at a predetermined inlet pressure of the first pump 130. In some embodiments, the second pump 140 may comprise a uni-directional pump configured to pump the reductant in only one direction, that is from the reductant storage tank 110 towards the second pump 140.

In particular embodiments, the second pump 140 may comprise a lift pump. For example, the second pump 140 may be positioned at a higher elevation relative to the reductant storage tank 110 with respect to gravity. The second pump 140 may be configured to lift the reductant from the reductant storage tank 110 and deliver the reductant to the first pump 130. Furthermore, the second pump 140 may be configured to pump the reductant as well as air. In one embodiment, the second pump 140 comprises a diaphragm pump (e.g., a diaphragm pump with flapper valves).

A valve 128 is positioned in the reductant delivery line 122 upstream of the second pump 140. The valve 128 may include, for example a diaphragm valve, a ball valve, a butterfly valve, a plug valve, a needle valve, or any other suitable valve. Furthermore, the valve 128 may be remotely activated, for example via a signal from the controller 170, as described below in further detail herein.

The valve 128 is selectively moveable between a closed position and an open position. FIG. 2A shows the reductant insertion assembly 120 with the valve 128 in a closed position, and FIG. 2B shows the reductant insertion assembly 120 with the valve 128 in an open position. In some embodiments, the reductant insertion assembly 120 may comprise a valve conduit 129 fluidly coupled to the reductant delivery line 122 upstream of the second pump 140, as shown in FIGS. 2A-B. The valve 128 may be positioned in the valve conduit 129. For example, the valve conduit 129 may include a T-pipe or a pipe coupled to the reductant delivery line 122 via a T-connector, with the valve 128 positioned therein.

During normal operation of the reductant insertion assembly 120, for example when the engine 10 is on and exhaust gas is being communicated into the SCR system 150, the valve 128 is in the closed position as shown in FIG. 2A. In the closed positioned of the valve 128, the second pump 140 pumps the reductant from the reductant storage tank 110 through the reductant delivery line 122 to the first pump 130. The first pump 130 may pump at least a portion of the reductant received from the second pump 140 to the SCR system 150. Any remaining portion of the reductant may be returned to the reductant storage tank 110 via the reductant return line 124.

The valve 128 may be moved into the open position when it is desirable to purge the reductant from the reductant insertion assembly 120, for example when the engine 10 is turned off and the exhaust gas is not flowing through the SCR system 150. In the open position, as shown in FIG. 2B the second pump 140 draws air through the valve 128 and pumps the air through at least a portion of the reductant delivery line 122 downstream of the valve 128 and the first pump 130 such that the air purges the reductant insertion assembly 120 of the reductant. For example, the air flowing into the portion of reductant delivery line 122 upstream of the valve 128 flows through the second pump 140, the first pump 130 and through the reductant return line 124 towards the reductant storage tank 110, purging the reductant insertion assembly 120 of the reductant. A vent valve (not shown) may be provided in the reductant storage tank 110, which may be configured to selectively open to vent the reductant storage tank 110 if, for example a tank pressure in the reductant storage tank 110 increases beyond a tank pressure threshold due to the purging air flowing therein.

As previously described, the second pump 140 may be positioned at a higher elevation relative to the reductant storage tank 110. In such embodiments, any reductant remaining in the reductant delivery line 122 upstream of the valve 128 returns to the reductant storage tank 110 under gravity when the valve 128 is in the closed position.

In some embodiments, the aftertreatment system 100 may also comprise a controller 170, as shown in FIG. 1. The controller 170 may comprise any suitable controller, for example the control circuitry 171 of FIG. 3 or the computing device 370 of FIG. 5. The controller 170 is operably coupled to the valve 128, and the second pump 140, and may also be operably coupled to the first pump 130 and the engine 10.

In various embodiments, the controller 170 may also be configured to determine an engine operating condition of the engine 10. For example, the controller 170 may be operatively coupled to the engine 10 and configured to receive an engine operating signal corresponding to an engine operating condition of the engine 10. A combination of the signals generated by one or more sensors may be indicative of the engine operating condition of the engine 10. Such signals may comprise a vehicle speed (e.g., a speed of a vehicle including the engine 10 and the aftertreatment system 100), an engine speed of the engine 10, an engine torque of the engine 10, an exhaust gas mass flow emitted by the engine 10, a temperature of the exhaust gas at an inlet of the aftertreatment system 100, and/or an ambient temperature. In particular embodiments, the engine operating condition may include one of the engine 10 is on or the engine 10 is off.

In various embodiments, the controller 170 may be configured to receive and interpret a first sensor signal from the first sensor 103 (e.g., a first NOx sensor) and/or a second sensor signal from the second sensor 105 (e.g., the second NOx sensor) so as to determine the engine operating condition of the engine 10. The controller 170 may use the engine operating signal, the first sensor signal and/or the second sensor signal to determine an amount of reductant to be inserted into the SCR system 150.

The controller 170 may then instruct the first pump 130 to insert the predetermined amount of reductant into the SCR system 150. Furthermore, the controller 170 may instruct the second pump 140 to deliver a predetermined amount of the reductant to the first pump 130 at a predetermined pressure, for example to maintain a reductant inlet pressure at a first pump inlet of the first pump 130.

In response to determining that the engine 10 is off, the controller 170 instructs the valve 128 to move into the open position. The second pump 140 keeps running after the valve 128 is opened, and draws in air through the valve 128 (e.g., through the valve conduit 129 in which the valve 128 is positioned). The air purges at least a portion of the reductant delivery line 122, for example the portion of the reductant delivery line 122 downstream of the valve 128, the second pump 140, the first pump 130 and the reductant return line 124. Any amount of reductant remaining in the reductant delivery line 122 upstream of the valve 128 may return to the reductant storage tank 110 under the influence of gravity, as previously described herein.

In some embodiments, the controller 170 instructs the second pump 140 to activate for a predetermined pumping time when the valve 128 is in the open position. For example, the predetermined pumping time may correspond to a time taken by the second pump 140 to pump sufficient amount of air through the reductant insertion assembly 120 to completely purge the reductant insertion assembly 120 of the reductant.

Furthermore, the controller 170 may move the valve 128 into the open position for a predetermined valve open time. The predetermined valve open time corresponds to the predetermined pumping time. In other words, the valve 128 is opened for as long as the second pump 140 pumps air through the reductant insertion assembly 120, and closes as soon as the second pump 140 stops pumping the air. In other embodiments, in response to determining that the engine 10 is on, the controller 170 instructs the valve 128 to move into the closed position. For example, once the engine 10 is turned OFF and the valve 128 is opened, the valve 128 may remain open until engine 10 is turned ON again. Once the controller 170 is turned ON, the controller 170 instructs the valve 128 to move into the closed position. Furthermore, in response to determining that the engine 10 is on, the controller 170 may instruct the first pump 130 to insert the reductant into the SCR system 150, for example based on one or more of the engine operating conditions.

Figure 3:
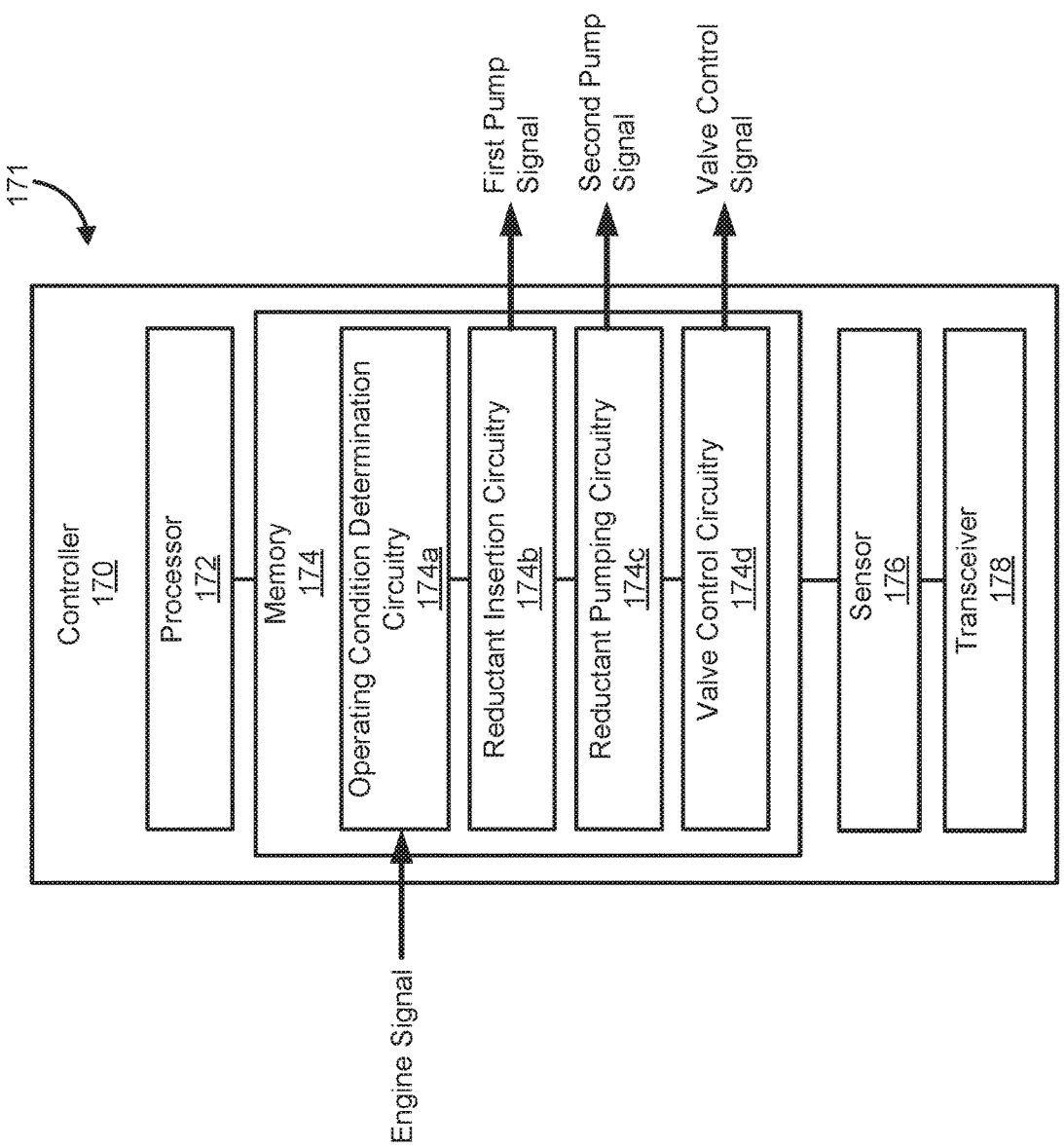
FIG. 3 is a schematic block diagram of a controller which may be included in the aftertreatment system of FIG. 1, according to an embodiment.
Figure 4:
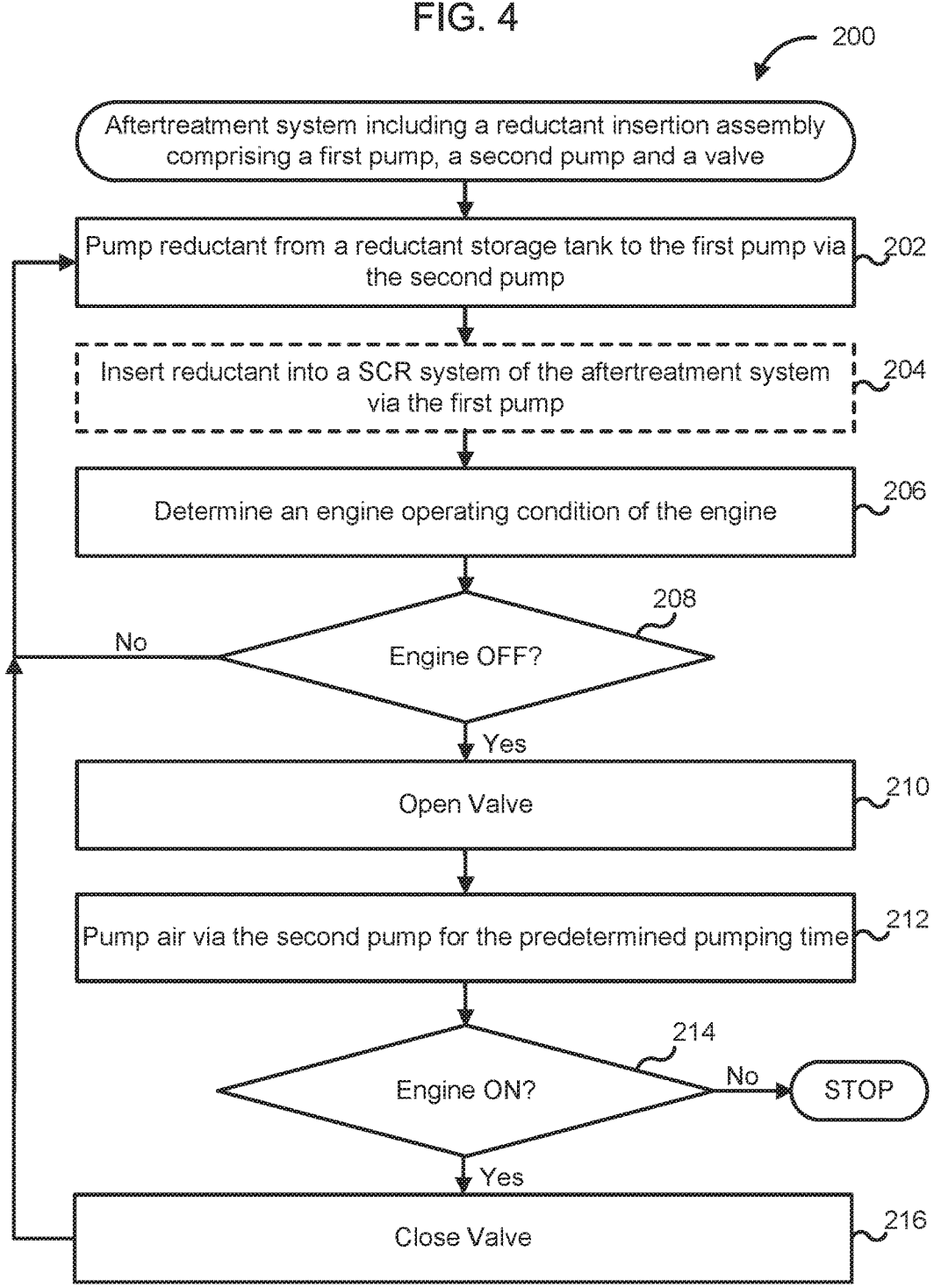
FIG. 4 is a schematic flow diagram of an example method for purging a reductant insertion assembly of a reductant, according to an embodiment.

In particular embodiments, the controller 170 can be included in a control circuitry. For example, FIG. 3 is a schematic block diagram of a control circuitry 171 that comprises the controller 170, according to an embodiment. The controller 170 comprises a processor 172, a memory 174 or any other computer readable medium, a transceiver 178, and a sensor 176. It should be understood that the controller 170 shows only one embodiment of the controller 170 and any other controller capable of performing the operations described herein can be used.

The processor 172 may comprise a microprocessor, programmable logic controller (PLC) chip, an ASIC chip, or any other suitable processor. The processor 172 is in communication with the memory 174 and configured to execute instructions, algorithms, commands, or otherwise programs stored in the memory 174.

The memory 174 comprises any of the memory and/or storage components discussed herein. For example, memory 174 may comprise a RAM and/or cache of processor 172. The memory 174 may also comprise one or more storage devices (e.g., hard drives, flash drives, computer readable media, etc.) either local or remote to controller 170. The memory 174 is configured to store look up tables, algorithms, or instructions.

For example, the memory 174 may comprise an operating condition determination circuitry 174a. The operating condition determination circuitry 174a may be configured to receive an engine signal from the engine 10, for example via the sensor 176, and determine an engine operating condition of the engine 10. For example, the operating condition determination circuitry 174a determines if the engine 10 is on or off.

The memory 174 also includes a reductant insertion circuitry 174b The reductant insertion circuitry 174b is configured to generate a first pump signal. The first pump signal is communicated to the first pump 130, for example via the transceiver 178, and instructs the first pump 130 to insert the reductant into the first pump 130, for example in response to the engine 10 being on. The memory 174 also includes a reductant pumping circuitry 174c configured to generate a second pump signal communicated to the second pump 140, for example via the transceiver 178. The second pump signal instructs the second pump 140 to pump the reductant or air through the reductant insertion assembly 120.

Moreover, the memory 174 includes a valve control circuitry 174d. The valve control circuitry 174d is configured to generate a valve control signal communicated to the valve 128, for example via the transceiver 178. The valve control signal instructs the valve 128 to move into the open or the closed position. For example, in response to the operating condition determination circuitry 174a determining from the engine operating signal that the engine 10 is off, the valve control circuitry 174d instructs the valve 128 to move into the open position.

In some embodiments, the reductant pumping circuitry 174c may be configured to instruct the second pump 140 to activate for a predetermined pumping time when the valve 128 is in the open position. Furthermore, the valve control circuitry 174d may be configured to move the valve 128 to move into the open position for a predetermined valve open time. The predetermined valve open time may correspond to the predetermined pumping time. In particular embodiments, in response to the operating condition determination circuitry 174a determining that the engine 10 is on, the valve control circuitry 174d may instruct the valve 128 to move into the closed position. Moreover, the reductant insertion circuitry 174b may instruct the first pump 130 to insert the reductant into the SCR system 150.

FIG. 3 is a schematic flow diagram of an example method 200 for inserting a reductant into an SCR system (e.g., the SCR system 150) of an aftertreatment system (e.g., the aftertreatment system 100) using a reductant insertion assembly (e.g., the reductant insertion assembly 120 or any other reductant insertion assembly described herein). The reductant insertion assembly comprises a first pump (e.g., the first pump 130), a second pump (e.g., the second pump 140) and a valve (e.g., the valve 128).

The method 200 comprises pumping a reductant from a reductant storage tank to the first pump via the second pump, at 202. For example, the second pump 140 pumps the reductant from the reductant storage tank 110 to the first pump 130. In particular embodiments, the method 200 also comprises inserting the reductant into an SCR system of the aftertreatment system via the first pump, at 204. For example, the first pump 130 inserts the reductant into the SCR system 150 of the aftertreatment system 100.

An engine operating condition of the engine is determined, at 206. For example, the operating condition determination circuitry 174a of the controller 170 receives an engine signal from the engine 10 and determines the engine operating condition therefrom. The engine operating condition may include among other engine operating parameters, whether the engine 10 is in on or off.

It is determined if the engine is off, at 208. For example, the operating condition determination circuitry 174a determines from the engine operating parameters whether the engine 10 is on or off. If the engine is not off (i.e., is on), the method 200 returns to operation 202. In response to determining that the engine is off, the valve is opened so as to allow air to enter the reductant insertion assembly, at 210. For example, if the operating condition determination circuitry 174a determines that the engine 10 is off, the valve control circuitry 174d of the controller 170 instructs the valve 128 to move into the open position, allowing air to enter the reductant delivery line 122.

Air is pumped via the second pump for a predetermined pumping time so as to purge the reductant insertion assembly of the reductant, at 212. For example, the reductant pumping circuitry 174c instructs the second pump 140 to pump air through at least a portion of the reductant delivery line 122, the first pump 130 and the reductant return line 124 for the predetermined pumping time so as to purge the reductant insertion assembly 120 of the reductant. In particular embodiments, the valve 128 is opened for a predetermined valve open time which corresponds to the predetermined pumping time. As previously described, the second pump 140 may be at a higher elevation relative to the reductant storage tank 110 with respect to gravity such that any reductant remaining in the reductant delivery line 122 upstream of the valve 128 returns to the reductant storage tank 110 via gravity when the valve 128 is opened.

It is determined if the engine is on, at 214. For example, the operating condition determination circuitry 174a determines if the engine 10 is on. If the engine is not on (i.e., the engine is off), the method 200 stops. In response to determining that the engine is on, the valve is closed at 216. For example, if the operating condition determination circuitry 174a determines that the engine 10 is on, the valve control circuitry 174d instructs the valve 128 to move into the closed position. The reductant pumping circuitry 174c may instruct the second pump 140 to deliver the reductant from the reductant storage tank 110 to the first pump 130 via the reductant delivery line 122. Furthermore, the reductant insertion circuitry 174b may instruct the first pump 130 to insert the reductant into the SCR system 150, for example based on one or more engine operating parameters.

Figure 5:
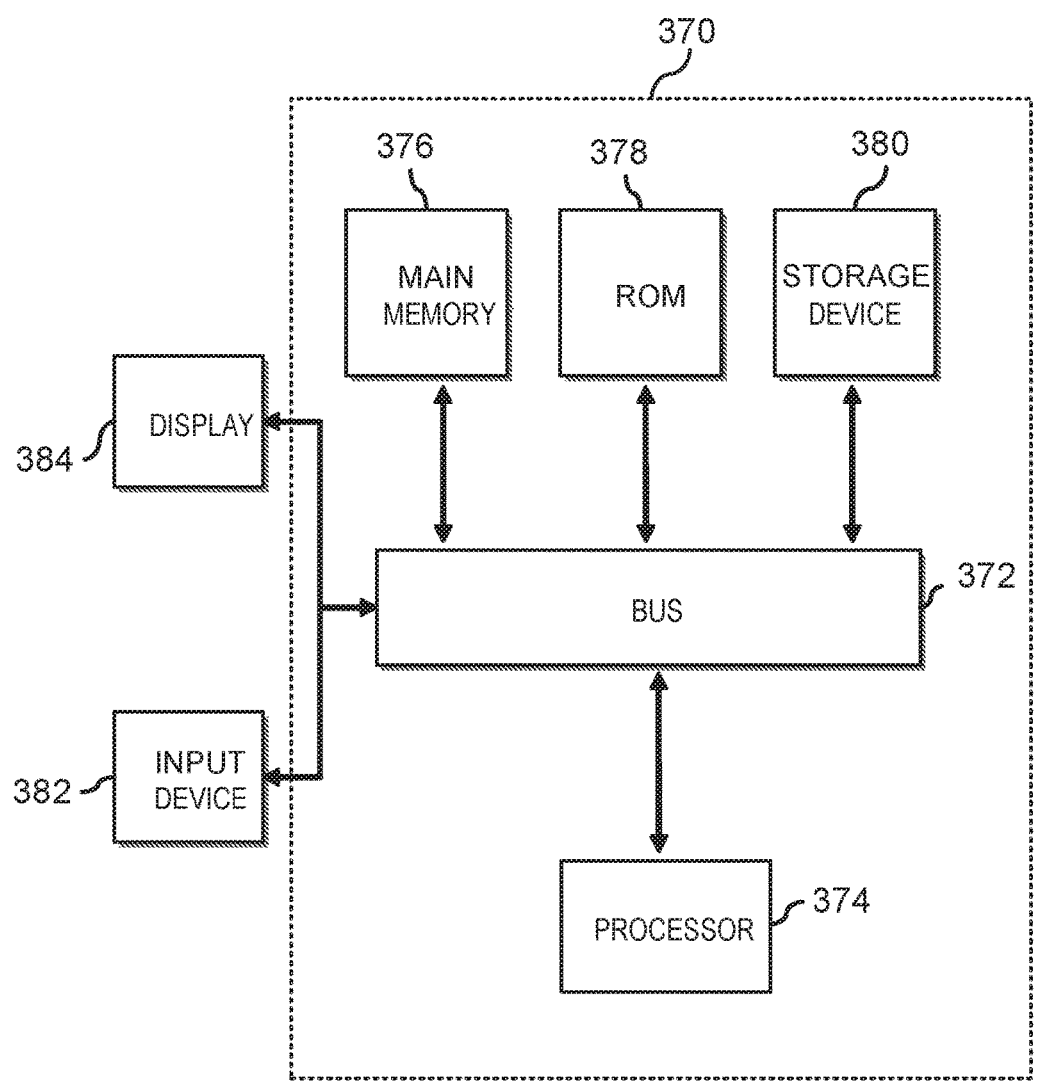
FIG. 5 is a schematic block diagram of a computing device which may be used as the controller shown in FIGS. 1 and/or 3.

In some embodiments, the controller 170, the control circuitry 171, or any of the controller or control circuitries described herein can comprise a system computer of an apparatus or system which comprises the aftertreatment system 100 (e.g., a vehicle, an engine or generator set, etc.). For example, FIG. 5 is a block diagram of a computing device 370 in accordance with an illustrative implementation. The computing device 370 can be used to perform any of the methods or the processes described herein, for example the method 200. In some embodiments, the controller 170 can comprise the computing device 370. The computing device 370 comprises a bus 372 or other communication component for communicating information. The computing device 370 can also comprise one or more processors 374 or processing circuits coupled to the bus 372 for processing information.

The computing device 370 also comprises main memory 376, such as a random access memory (RAM) or other dynamic storage device, coupled to the bus 372 for storing information and instructions to be executed by the processor 374. Main memory 376 can also be used for storing position information, temporary variables, or other intermediate information during execution of instructions by the processor 374. The computing device 370 may further comprise ROM 378 or other static storage device coupled to the bus 372 for storing static information and instructions for the processor 374. A storage device 380, such as a solid-state device, magnetic disk or optical disk, is coupled to the bus 372 for persistently storing information and instructions. For example, instructions corresponding operations of the method 200 can be stored on the storage device 380.

The computing device 370 may be coupled via the bus 372 to a display 384, such as a liquid crystal display or active matrix display, for displaying information to a user. An input device 382, such as a keyboard or alphanumeric pad, may be coupled to the bus 372 for communicating information and command selections to the processor 374. In another implementation, the input device 382 has a touch screen display 384.

According to various implementations, the processes and methods described herein can be implemented by the computing device 370 in response to the processor 374 executing an arrangement of instructions contained in main memory 376 (e.g., the operations of the method 200). Such instructions can be read into main memory 376 from another non-transitory computer-readable medium, such as the storage device 380. Execution of the arrangement of instructions contained in main memory 376 causes the computing device 370 to perform the illustrative processes described herein. One or more processors in a multi-processing arrangement may also be employed to execute the instructions contained in main memory 376. In alternative implementations, hard-wired circuitry may be used in place of or in combination with software instructions to effect illustrative implementations. Thus, implementations are not limited to any specific combination of hardware and software.

Although an example computing device 370 has been described in FIG. 5, implementations described in this specification can be implemented in other types of digital electronic, or in computer software, firmware, or hardware, including the structures disclosed in this specification and their structural equivalents, or in combinations of one or more of them.

Implementations described in this specification can be implemented in digital electronic, or in computer software, firmware, or hardware, including the structures disclosed in this specification and their structural equivalents, or in combinations of one or more of them. The implementations described in this specification can be implemented as one or more computer programs (i.e., one or more circuitries of computer program instructions) encoded on one or more computer storage media for execution by, or to control the operation of, data processing apparatus. A computer storage medium comprises a non-transitory computer readable medium and can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources. The term "data processing apparatus" or "computing device" encompasses all kinds of apparatus, devices, and machines for processing data, including, by way of example, a programmable processor, a computer, a system on a chip, or multiple ones, or combinations of the foregoing. The apparatus can comprise special purpose logic, e.g., an FPGA (field programmable gate array) or an ASIC (application-specific integrated circuit). In addition to hardware, the apparatus can also comprise code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a circuitry, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuitries, sub-programs, or portions of code). A computer program can be deployed to be executed on one computer, on multiple computers that are located at one site, or distributed across multiple sites and interconnected by a communication network.

Processors suitable for the execution of a computer program comprise, by way of example, both general and special purpose microprocessors and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also comprise, or be operatively coupled to receive data from or transfer data to, or both, one or more mass storage devices for storing data (e.g., magnetic, magneto-optical disks, or optical disks). However, a computer need not have such devices. Devices suitable for storing computer program instructions and data comprise all forms of non-volatile memory, media and memory devices, including, by way of example, semiconductor memory devices (e.g., EPROM, EEPROM, and flash memory devices); magnetic disks (e.g., internal hard disks or removable disks); magneto-optical disks; and CD-ROM and DVD-ROM disks. The processor and the memory can be supplemented by, or incorporated in, special purpose logic.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements; values of parameters, mounting arrangements; use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes, and omissions may also be made in the design, operating conditions, and arrangement of the various exemplary embodiments without departing from the scope of the present application.

While this specification contains many specific implementation details, these should not be construed as limitations on the scope of any embodiments or of what may be claimed, but rather as descriptions of features specific to particular implementations of particular embodiments. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A reductant insertion assembly comprising:
    a first pump configured to pump a predetermined amount of a reductant into a selective catalytic reduction system;
    a reductant delivery line fluidly coupled to the first pump, the reductant delivery line configured to deliver the reductant to the first pump from a reductant storage tank;
    a reductant return line fluidly coupled to the first pump and configured to return at least a portion of the reductant to the reductant storage tank from the first pump;
    a second pump positioned in the reductant delivery line upstream of the first pump, the second pump configured to pump the reductant from the reductant storage tank to the first pump; and
    a valve positioned in the reductant delivery line upstream of the second pump, the valve being selectively moveable between a closed position in which the second pump pumps the reductant through the reductant delivery line to the first pump, and an open position in which the second pump draws air through the valve and pumps the air through at least a portion of the reductant delivery line downstream of the valve and the first pump to purge the reductant insertion assembly of the reductant.

2. The reductant insertion assembly of claim 1, wherein the second pump is at a higher elevation than the reductant storage tank with respect to gravity such that any reductant remaining in the reductant delivery line upstream of the valve returns to the reductant storage tank under gravity when the valve is in the closed position.

3. The reductant insertion assembly of claim 1, wherein the second pump comprises a uni-directional pump.

4. The reductant insertion assembly of claim 3, wherein the second pump comprises a diaphragm pump.

5. The reductant insertion assembly of claim 1, further comprising a valve conduit fluidly coupled to the reductant delivery line upstream of the second pump, wherein the valve is positioned in the valve conduit.

6. An aftertreatment system for use with an engine producing exhaust gas, the aftertreatment system comprising
    a selective catalytic reduction system configured to decompose constituents of the exhaust gas;
    a reductant storage tank configured to store a reductant; and
    a reductant insertion assembly fluidly coupled to the reductant storage tank, the reductant insertion assembly comprising:
        a first pump configured to pump a predetermined amount of a reductant into the selective catalytic reduction system;
        a reductant delivery line fluidly coupled to the first pump, the reductant delivery line configured to deliver the reductant to the first pump from the reductant storage tank;
        a reductant return line fluidly coupled to the first pump and configured to return at least a portion of the reductant to the reductant storage tank from the first pump;

a second pump positioned in the reductant delivery line upstream of the first pump, the second pump configured to pump the reductant from the reductant storage tank to the first pump; and a valve positioned in the reductant delivery line upstream of the second pump, the valve being selectively moveable between a closed position in which the second pump pumps the reductant through the reductant delivery line to the first pump, and an open position in which the second pump draws air through the valve and pumps the air through at least a portion of the reductant delivery line downstream of the valve and the first pump to purge the reductant insertion assembly of the reductant.

7. The aftertreatment system of claim 6, wherein the second pump is at a higher elevation than the reductant storage tank with respect to gravity such that any reductant remaining in the reductant delivery line upstream of the valve returns to the reductant storage tank under gravity when the valve is in the closed position.

8. The aftertreatment system of claim 6, wherein the second pump comprises a uni-directional pump.

9. The aftertreatment system of claim 8, wherein the second pump comprises a diaphragm pump.

10. The aftertreatment system of claim 6, further comprising a valve conduit fluidly coupled to the reductant delivery line upstream of the second pump, wherein the valve is positioned in the valve conduit.

11. The aftertreatment system of claim 6, further comprising a controller operably coupled to the reductant insertion assembly, the controller being configured to:
   determine an engine operating condition of the engine, and
   in response to determining that the engine is off, instruct the valve to move into the open position.

12. The aftertreatment system of claim 11, wherein the controller is further configured to:
   instruct the second pump to activate for a predetermined pumping time when the valve is in the open position.

13. The aftertreatment system of claim 12, wherein the controller is configured to, in response to determining that the engine is off, instruct the valve to move into the open position for a predetermined valve open time corresponding to the predetermined pumping time.

14. The aftertreatment system of claim 12, wherein the controller is further configured to:
   in response to determining that the engine is on, instruct the valve to move into the closed position.

15. The aftertreatment system of claim 11, wherein the controller is further configured to:
   in response to determining that the engine is on, instruct the first pump to insert the reductant into the selective catalytic reduction system.

16. A method for purging a reductant from a reductant insertion assembly included in an aftertreatment system, the reductant insertion assembly comprising a first pump, a second pump and a valve, the method comprising:
   pumping the reductant from a reductant storage tank to the first pump via the second pump;
   determining an engine operating condition of an engine fluidly coupled to the aftertreatment system;
   in response to determining that the engine is off, opening the valve so as to allow air to enter the reductant insertion assembly; and
   pumping the air through the reductant insertion assembly for a predetermined pumping time via the second pump so as to purge the reductant insertion assembly of the reductant.

17. The method of claim 16, wherein, in response to determining that the engine is off, valve is opened for a predetermined valve open time corresponding to the predetermined pumping time.

18. The method of claim 16, further comprising:
   in response to determining that the engine is on, closing the valve.

19. The method of claim 16, further comprising:
   in response to determining that the engine is on, inserting the reductant into a selective catalytic reduction system of the aftertreatment system via the first pump.

20. The method of claim 16, wherein the second pump is at a higher elevation relative to the reductant storage tank with respect to gravity such that any reductant remaining in the reductant delivery line upstream of the valve returns to the reductant storage tank via gravity when the valve is opened.

* * * * *